# 2,961,878

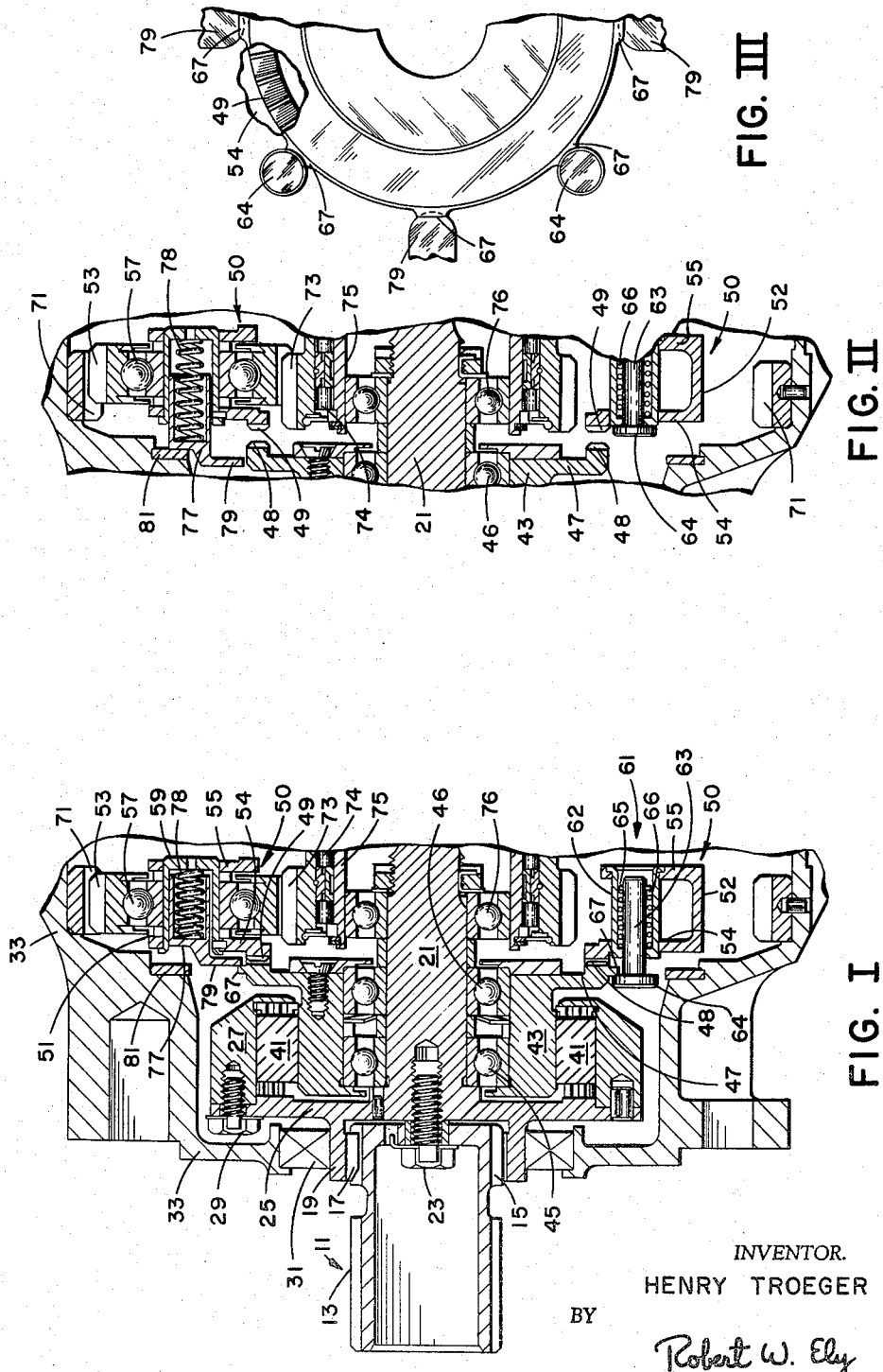
Nov. 29, 1960 — H. TROEGER — 2,961,878
STARTER HAVING REVERSE TORQUE RELEASE
Filed June 30, 1959
INVENTOR.
HENRY TROEGER
BY
Robert W. Ely
ATTORNEY

STARTER HAVING REVERSE TORQUE RELEASE

Henry Troeger, Otsego, Cooperstown, N.Y., assignor to The Bendix Corporation, a corporation of Delaware Filed June 30, 1959, Ser. No. 823,945

8 Claims. (Cl. 74—7)

This invention relates to starters for turbine engines and more particularly concerns such starters having an overrunning sprag clutch connecting planetary gearing to structure for connection to the engine.

In such starters, the overrunning clutch which transmits torque in one direction provides an arrangement for the starter to drive the engine; but, when the engine is started, the clutch operates so that the engine does not drive the starter. With this arrangement, there is the possibility of failure of the overrunning clutch. In such an event, the engine would drive the starter at speeds which would cause the starter to be damaged.

An object of the present invention is to provide an improved starter arrangement having planetary gear means, an overrunning clutch and reverse torque release which prevents the engine from driving and damaging the starter if the overrunning clutch fails.

A further object is to provide such a starter arrangement having a jaw-teethed reverse torque release which requires a minimum of axial space and is rapidly operated.

Another object is to provide such a starter arrangement having a reverse torque release which has parts including jaw teeth, latch means and spacing means compactly associated with the ring which carries the planet gears.

The realization of the above objects along with the features of the present invention will be apparent from the following description and the accompanying drawing in which:

Fig. 1 is a longitudinal cross sectional view of a starter embodying the invention and shows a reverse torque release having jaw teeth between planet gear structure and a drive mmeber which connects to a sprag clutch;

Fig. 2 is a view of the disconnected reverse torque release of Fig. 1 and shows the disengagement and the spacing of the jaw teeth and the axial movement of the planet gear; and Fig. 3 is an end view (as seen from the left of Fig. 1) of half of the tubular drive member which has a flange with tabs and the elements of the release which coact with the tabs and suggests the actual arrangement of four equally-spaced planet gears.

It is to be noted that Figs. 1 and 2 are views cross-sectioned to show the latch means of the release structure which is located between the four planet gears.

Referring to Fig. 1, the externally-splined axial stub shaft 11 at the left has outer spline 13 for connection to an aircraft jet engine (not shown) and an axially-inner spline 15 which meshes with internal spline 17 of tubular extension 19 of axial shaft member 21. Member 21 is connected to shaft 11 by fastener 23 and has an outwardly-extending flange 25. The periphery of flange 25 has an axially-extending clutch ring 27 connected thereto by fasteners 29. A seal 31 extends between extension 19 and starter housing 33.

A sprag clutch 41 connects overhanging clutch ring 27 to a tubular drive or output member 43 which is axially-positioned by two bearings 45 and 46 carried by shaft member 21. Drive member 43 has at its inner end a radially-outwardly-extending connecting flange 47 which at its periphery has jaw teeth 48 facing axially-inwardly and meshing with jaw teeth 49 in planet-connecting ring 50. The engaged starter-type jaw teeth have conventional axial extending faces and inclined faces and are arranged to separate when flange 47 tries to drive planet carrier ring 50 and to be normally engaged when the starter is driving the engine through clutch 41.

Ring 50 is generally of U-shaped cross-section (opening inwardly) and has openings 51 in the peripheral wall 52 for four planet gears 53 which are mounted between side walls 54 and 55 of ring 50. The jaw teeth 49 are formed in the radially-inner part of outer wall 54 of ring 50 which is opposite the overlapping part of flange 47. Planet gears 53 are mounted on bearings 57 which are carried by axially-outwardly facing cups 59 mounted in side walls 54 and 55. Four equi-spaced planet gears 53 are provided but Figs. 1 and 2 of the drawing, as mentioned, are cross-sectioned to show structure located circumferentially between the planet gears 53. Four spring-biased holding means 61 carried by ring 50 between planet gears 53 are provided for pulling the ring 50 toward the connecting flange 47 and for maintaining the saw teeth 48 and 49 engaged. Means 61 is comprised of an axially-inwardly-facing cup 62 mounted in ring 50, plunger 63 having a circular button 64 at the outer end and a transversely-extending pin 65 at the inner end, and a spring 66 confined in cups 62 around plunger 63 by pin 65 so that, when button 64 latches or fits over radially-outwardly-extending tab 67 of connecting flange 47, the jaw teeth 48 and 49 are urged together. Latch means are thus provided by holding means 61 for holding the jaw teeth together until reverse torque at the teeth releases buttons 64 by rotation relative to tabs 67.

The planet gears 53 mesh in a radially-outer fixed ring gear 71 mounted in housing 33 and are driven by a drive pinion 73 which is mounted on two roller bearings 74 carried by stationary support member 75. Ball bearing 76 is positioned between support member 75 and the inner part of shaft member 21. Pinion 73 is powered by other starter structures (not shown) which include a first stage planetary gearing and a starter air turbine. It is to be noted that planet gears 53 can be moved axially-inwardly in ring gear 71 and drive pinion 73. Such movement is resisted uniformily around the circumference by the spring-biased plungers 63 held by tabs 67 on the fixed connecting flange 47. It is apparent that, when reverse torque axially separates the teeth 48 and 49 and plungers 63 are released from tabs 67, planet gears 53 will be moved axially inward a small distance and can be further moved axially.

Referring to the planet gear 53, it can be seen that the cup 59 contains a spacing piston 77 which is biased axially-outwardly by spring 78. Piston 77 has a radially-inwardly-projecting lip or tongue 79 which bears against the axial inner face of a tab 67 to restrain piston 77. The circumferential width of tongue 79 is such that the tongue will move rapidly out of contact with tab 67 when the teeth 48 and 49 rotate relative to each other in separation. When so released, spring-biased piston 77 will move axially-outwardly into contact with the annular limit shoulder 81 in the housing 33 which faces the centers of pinions 53 so that pinions 53 are urged axially a limited distance. Teeth 49 in ring 50 are thus spaced from teeth 48 in flange 47 whereby clasing is prevented. Before separation of the teeth, it is apparent that the urging of spring 78 is opposed by the action of spring 66 which is appreciably stronger than spring 78 so that spring 78 is nullified or effectively offset. Thus, the teeth are maintained engaged and no axially-inwardly movement of pinions 53 occurs before reverse torque starts to separate the teeth 48 and 49 with axially-inward movement.

In Fig. 2 which shows the disengaged and spaced relation of teeth 48 and 49 when reverse torque has operated the release arrangement, it can be noted that plunger 63 has been urged axially-inwardly by spring 66 so that its button 64 abuts cup 62. Spacing piston 77 abuts limit shoulder 81 and prevents clashing of teeth 48 and 49. Planet gears 53 in ring 50 have been moved axially-inwardly over drive pinion 73 and ring gear 71.

In Fig. 3 the actual arrangement of tabs 67 on flange 47 and of the alternating buttons 64 and tongues or lips 79 is shown. It is apparent that four planet gears are provided and that buttons 64 and tongues 79 can move axially between the tabs 67 when they rotate relative to flange 47. Flange 47 has been broken away to show that teeth 49 in the side wall 54 of the planet ring are essentially the same short width circumferentially as the tabs 67 whereby rapid release of buttons 64 and tongues 79 results upon the ratchet separation of the jaw teeth. It is to be noted that full width of the tongues 79 and buttons in contact with the tabs 67 is the same width as the tabs 67.

In operation, the starter normally transmits torque through the engaged jaw teeth 48 and 49 and sprag clutch 41 so that stub shaft 11 rotates an associated aircraft engine to starting speed. After starting, the engine will rotate at a speed which exceeds the starter speed and the engine and connected starter structure including clutch ring 27 will normally overrun the remainder of the starter due to disengagement of sprag clutch 41. The starter will be de-energized at start-up speed and will coast to rest as the engine overruns. However, if sprag clutch 41 malfunctions, the engine will not overrun and will tend to drive the starter and generate reverse torque. This reverse torque at a predetermined value overcomes spring 66 and causes a ratchet separation of the jaw teeth 48 and 49 via their inclined faces and planet ring 50 will rotate relative to drive member 43 so that buttons 64 and tongues 79 will slip circumferentially from contact with tabs 67. Buttons 64 will then move through the spaces between tabs 67 under the urging of spring 66 to the retracted position shown in Fig. 2. Springs 78 will move pistons 77 axially-outward between tabs 67, since tongues 79 like buttons 64 are not restrained, until pistons 77 bear against stationary annular limiting shoulder 81 as shown in Fig. 2. At that point, springs 78 will further urge ring 50 and planet gears 53 to the right so that jaw teeth 49 are positioned to prevent clashing or contact with jaw teeth 48 in the axially-fixed drive member 43. The pistons 77 will slide on shoulder 81 with tongues 79 clearing tabs 67. Since the jaw teeth are disengaged and spaced, it is not possible for an associated engine to drive the starter and cause damage thereto. It is to be noted that the release is rapidly operated and is compactly arranged between the planetary gear means and the sprag clutch. With the alternate and equi-spaced latching and spacing, the teeth are tensioned uniformly around the circumference and the axial movement of the planet gears is facilitated.

It is to be understood that changes can be made in the disclosed embodiment of the invention by persons skilled in the art without departing from the invention as defined in the appended claims.

What is claimed is:

1. In a starter having an annular output member connected to engine connecting means by a sprag clutch, the improvement for reverse torque release comprised of a radially-extending flange at the inner end of the annular output member, a planetary drive pinion adjacent said flange, planet gears meshing with said drive pinion, a fixed ring gear meshing with said planet gears, a planet carrier ring mounting said planet gears and having a side wall facing said flange, said flange and said wall having facing jaw teeth in engagement, said planet carrier ring and said planet gears being movable axially-inwardly, latch means carried by said carrier ring and releasably connected to said flange, said latch means having spring means normally urging said carrier ring toward said flange when said teeth are engaged, said latch means being releasable from said flange when a predetermined reverse torque overcomes said spring means and causes said teeth to ratchet and to rotate said ring with axially-inwardly movement of said ring whereby the output member is disconnected from the planet gears when the sprag clutch fails and a connected engine begins to drive the starter.

2. An engine starter including means for connecting the starter to an engine so that a connected engine can overrun the starter, said means including an axially-fixed rotatable output member having a radially extending flange, planetary gear means including a planet carrier ring having a side wall facing said flange, planet gears mounted in said ring and with said ring being axially-inwardly movable in said planetary gear means, said side wall and said flange having mating jaw teeth, holding means carried by said ring normally urging said teeth into engagement, said holding means being made inoperative in response to reverse torque at said jaw teeth, and spacing means responsive to reverse torque at said jaw teeth and thereby operable to space said ring axially-inwardly so that said jaw teeth are out of contact whereby, if the means for connecting fails to provide overrunning and a connected engine drives the starter, the starter will be disconnected at the jaw teeth and clashing of jaw teeth will be prevented.

3. In a starter, a reverse torque release arrangement comprised of output means having an axially-outer member for connection to an engine, said output means including overrunning means whereby an associated engine after start-up is normally prevented from driving said starter, said output means at its axially-inner end having a radially-outwardly extending flange, said flange having at its periphery axially-inwardly facing jaw teeth, planetary gear means including a drive pinion, a fixed ring gear and planet gears meshed in the pinion and the ring gear, said planetary gear means including a ring in which said planet gears are mounted, said ring having jaw teeth meshed with the jaw teeth of said flange, said jaw teeth being arranged to separate when the speed of said flange exceeds the speed of said ring, holding means mounted in said ring and arranged to urge said jaw teeth together until reverse torque is transmitted whereby the jaw teeth separate and the starter is not driven upon failure of the overrunning means, and spacing means operable when said teeth are separated to space said ring and its teeth away from the teeth in said flange so that clashing is prevented.

4. The starter according to claim 3 and further characterized by said holding means including a plurality of tabs on said flange and circular buttons latched over said tabs, each of said buttons being part of a plunger which is spring-biased inwardly.

5. The starter according to claim 3 and being further characterized by said spacing means including a plurality of tabs on said flange and spring-biased pistons having tongues bearing against the inner face of said tabs, each of said pistons being slidably mounted in a cup mounted in said ring.

6. In a starter, a reverse torque release arrangement comprised of output means having an axially-outer member for connection to an engine, said output means including overrunning means whereby an associated engine after start-up is normally prevented from driving said starter, said output means at its axially-inner end having a radially-outwardly extending flange, said flange having at its periphery axially-inwardly facing jaw teeth, planetary gear means including a drive pinion, a fixed ring gear and planet gears meshed in the pinion and the ring gear, said planetary gear means including a ring in which said planet gears are mounted, said ring having jaw teeth meshed with the jaw teeth of said flange, said jaw teeth being arranged to separate when the speed of said flange exceeds the speed of said ring, holding means mounted in said ring and arranged to urge said jaw teeth together until reverse torque is transmitted whereby the jaw teeth separate and the starter is not driven upon failure of the overrunning means, and spacing means operable when said teeth are separated to space said ring and its teeth away from the teeth in said flange so that clashing is prevented, said holding means including a plurality of tabs on said flange and circular buttons latched over said tabs, each of said buttons being part of a plunger which is spring-biased inwardly, said spacing means including a plurality of tabs on said flange and spring-biased pistons having tongues bearing against the inner face of said tabs, each of said pistons being slidably mounted in a cup mounted in said ring.

7. In a starter having an engine connecting means connected to a drive member by a sprag clutch, the reverse torque release arrangement comprised of a drive pinion, a plurality of equi-spaced planet gears meshing with said pinion, a fixed ring gear meshing with said planet gears, a starter housing carrying said ring gear and providing an annular shoulder facing the outer center parts of said planet gears, a planet ring mounting said planet gears, said ring having radially-extending side walls and outwardly-facing cups supported in said side walls, said planet gears being rotatably mounted on said cups, the drive member having a flange which extends radially to overlap the radially inner part of said ring, said flange and the facing side wall of said ring having jaw teeth in engagement, said flange having a plurality of equi-spaced radially-extending tabs, pistons slidably received in said cups and springs within said cups biasing said piston outwardly, each of said pistons having a tongue contacting the inner face of one of said tabs whereby said pistons are restrained, plungers slidably mounted in said planet ring between said planet gears and spring-biased axially-inwardly, each of said plungers having a button which bears against the outer face of another of said tabs, said spring-biased plungers normally holding said jaw teeth in engagement, said tabs, said piston tongues and said plunger buttons being arranged so that when said teeth ratchet due to reverse torque said tongues and buttons will be released, said plungers when released from said tabs being arranged to be retracted against said planet ring, said spring-biased pistons when released from said tabs being arranged to abut said annular housing shoulder and to urge said planet gears and said ring axially-inwardly a predetermined distance so that said jaw teeth are spaced sufficiently to prevent clashing.

8. In a starter having an annular output member connected to engine connecting means by a sprag clutch, the improvement for reverse torque release comprised of a radially-extending flange at the inner end of the annular output member, a planetary drive pinion adjacent said flange, planet gears meshing with said drive pinion, a fixed ring gear meshing with said planet gears, a planet carrier ring mounting said planet gears and having a side wall facing said flange, said flange and said wall having facing jaw teeth in engagement, said planet carrier ring and said planet gears being movable axially-inwardly, latch means carried by said carrier ring and releasably connected to said flange, said latch means being releasable from said flange when a predetermined reverse torque causes said teeth to ratchet and to rotate said ring with axially-inwardly movement of said ring whereby the output member is disconnected from the planet gears when the sprag clutch fails and a connected engine begins to drive the starter, and spacing means operable when said teeth are separated and said latch means is released to space said ring and said flange whereby clashing of teeth is prevented.

References Cited in the file of this patent
UNITED STATES PATENTS

| | | |
|---|---|---|
| 2,665,674 | Metsger et al. | Jan. 12, 1954 |
| 2,721,482 | Shank et al. | Oct. 25, 1955 |
| 2,728,252 | Connell | Dec. 27, 1955 |
| 2,752,023 | Cain et al. | June 26, 1956 |